(12) United States Patent
Humphries et al.

(10) Patent No.: US 8,417,969 B2
(45) Date of Patent: Apr. 9, 2013

(54) STORAGE VOLUME PROTECTION SUPPORTING LEGACY SYSTEMS

(75) Inventors: Russell Humphries, Duvall, WA (US);
Octavian T. Ureche, Renton, WA (US);
Niels T. Ferguson, Redmond, WA (US);
Ping Xie, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 304 days.

(21) Appl. No.: 12/388,811

(22) Filed: Feb. 19, 2009

(65) Prior Publication Data

US 2010/0211802 A1 Aug. 19, 2010

(51) Int. Cl.
*G06F 21/00* (2006.01)

(52) U.S. Cl. .......................... 713/193; 713/189

(58) Field of Classification Search .................. None
See application file for complete search history.

(56) References Cited

U.S. PATENT DOCUMENTS

| | | |
|---|---|---|
| 5,459,867 A | 10/1995 | Adams et al. |
| 5,613,097 A | 3/1997 | Bates et al. |
| 5,918,047 A | 6/1999 | Leavitt et al. |
| 5,974,547 A | 10/1999 | Klimenko |
| 6,185,678 B1 | 2/2001 | Arbaugh |
| 6,363,400 B1 | 3/2002 | Chtchetkine et al. |
| 6,598,157 B1 | 7/2003 | McKee |
| 6,952,698 B2 | 10/2005 | Delaire et al. |
| 6,959,304 B1 | 10/2005 | Teig et al. |
| 6,963,951 B2 | 11/2005 | Ng et al. |
| 6,993,581 B1 | 1/2006 | Blumenau et al. |
| 7,120,786 B2 | 10/2006 | Miller et al. |
| 7,143,288 B2 | 11/2006 | Pham et al. |
| 7,174,421 B2 | 2/2007 | Ehrlich |
| 7,272,613 B2 | 9/2007 | Sim et al. |
| 7,281,111 B1 | 10/2007 | Blumenau |
| 7,437,387 B2 | 10/2008 | Cohen et al. |
| 7,502,898 B2 | 3/2009 | Blumenau et al. |
| 7,904,732 B2 | 3/2011 | Cui et al. |
| 2003/0037237 A1 | 2/2003 | Abgrall et al. |
| 2003/0066062 A1 | 4/2003 | Brannock et al. |
| 2003/0126426 A1 | 7/2003 | Frye, Jr. |
| 2003/0182312 A1 | 9/2003 | Chen et al. |
| 2004/0107422 A1 | 6/2004 | Cabrera et al. |

(Continued)

FOREIGN PATENT DOCUMENTS

| | | |
|---|---|---|
| WO | 2006067783 A2 | 6/2006 |
| WO | 2008017938 A2 | 2/2008 |
| WO | 2008127065 A1 | 10/2008 |

OTHER PUBLICATIONS

"Grand Stream Dreams . . .soaring up . . .chasing dreams . . .what will I do if I catch one . . . ", retrieved at <<http://grandstreamdreams.blogspot.com/2008/03/weekly-quality-finds-music-passwords.html>>, Mar. 16, 2008, pp. 4.

(Continued)

*Primary Examiner* — Kaveh Abrishamkar
*Assistant Examiner* — Adrian Stoica
(74) *Attorney, Agent, or Firm* — Wolfe-SBMC

(57) ABSTRACT

A storage volume is encrypted using a particular encryption technique, the storage volume including an access application and one or more cover files. The access application can be executed by a computing device having an operating system lacking support for the particular encryption technique, and allows the computing device to access data on the storage volume encrypted using the particular encryption technique.

20 Claims, 6 Drawing Sheets

U.S. PATENT DOCUMENTS

| | | | |
|---|---|---|---|
| 2005/0004925 A1 | 1/2005 | Stahl et al. | |
| 2005/0228937 A1 | 10/2005 | Karr et al. | |
| 2005/0268339 A1* | 12/2005 | Bobrow | 726/26 |
| 2006/0080397 A1 | 4/2006 | Chene et al. | |
| 2006/0179261 A1 | 8/2006 | Rajan | |
| 2006/0218165 A1 | 9/2006 | Vries et al. | |
| 2006/0265605 A1 | 11/2006 | Ramezani | |
| 2007/0074292 A1* | 3/2007 | Mimatsu | 726/26 |
| 2007/0180239 A1 | 8/2007 | Fujibayashi et al. | |
| 2007/0206224 A1 | 9/2007 | Nagashima et al. | |
| 2008/0028008 A1* | 1/2008 | Brunet et al. | 707/204 |
| 2008/0104148 A1 | 5/2008 | Schwaab et al. | |
| 2008/0115071 A1* | 5/2008 | Fair | 715/764 |
| 2008/0137838 A1 | 6/2008 | Lo | |
| 2008/0147964 A1* | 6/2008 | Chow et al. | 711/103 |
| 2008/0172555 A1 | 7/2008 | Keenan | |
| 2009/0067685 A1* | 3/2009 | Boshra et al. | 382/124 |
| 2010/0114990 A1 | 5/2010 | Mehra et al. | |

OTHER PUBLICATIONS

"70-292 Exam Study Notes", retrieved at <<http://www.netfresco.com/cert/70-292/>>, Dec. 16, 2008, pp. 6.

"Digital Stick", retrieved at <<http://www.digitalanchor.com/Digital-Stick.aspx>>, Dec. 16, 2008, p. 1.

"TSconnect 1.10", retrieved at <<http://www.itshareware.com/prodview-code_42881—download-tsconnect.htm>>, Dec. 16, 2008, p. 1.

"Final Office Action", U.S. Appl. No. 12/257,938, (Jun. 16, 2011), 15 Pages.

"Non-Final Office Action", U.S. Appl. No. 12/257,938, (Jan. 14, 2011), 22 Pages.

"Non-Final Office Action", U.S. Appl. No. 12/390,357, (Apr. 18, 2011), 19 Pages.

"Translucency Overlay File System LKM", http://sourceforge.net/projects/translucency.SourceForge.net, retrieved on Dec. 17, 2008, 2 pages.

Graf, et al., "A Capability Based Transparent Cryptographic File System", http://ieeexplore.ieee.org/stamp/stamp.jsp?arnumber=01587522, retrieved on Dec. 17, 2008—Proceedings of the 2005 International Conference on Cyberworlds, (Nov. 2005), 8 Pages.

Halderman, et al., "Lest We Remember: Cold Boot Attacks on Encryption Keys", http://citp.princeton.edu/pub/coldboot.pdf, revision 2.1, retrieved on May 28, 2008, (Apr. 2, 2008), 16 Pages.

McDonald, et al., "StegFS: A Steganographic File System for Linux", http://docs.ksu.edu.sa/PDF/Articles38/Article380600.pdf, retrieved on May 28, 2008, 15 Pages.

Strunk, et al., "Self Securing Storage: Protecting Data in Compromised Systems", retrieved on Dec. 17, 2008 at http://ieeexplore.ieee.org/stamp/stamp.jsp?arnumber=01264933., Proceedings of the Foundations of Intrusion Tolerant Systems (OASIS 2003), IEEE, (Dec. 2003), 15 Pages.

Weinhold, "Design and Implementation of a Trustworthy File System for L4", http://os.inf.tu-dresden.de/papers_ps/weinhold-diplom.pdf, (Mar. 23, 2006), 76 Pages.

White, et al., "LegionFS: A Secure and Scalable File System Supporting Cross-Domain High-Performance Applications", http://citeseer.ist.psu.edu/cache/papers/cs/23870/http:zSzzSzlegion.virginia.eduz.SzpaperszSzSC2001.pdf/white01legionfs.pdf, retrieved on May 28, 2008, 10 Pages.

"Non Final Office Action", U.S. Appl. No. 12/257,938, (Oct. 24, 2012), 8 Pages.

* cited by examiner

STORAGE VOLUME PROTECTION SUPPORTING LEGACY SYSTEMS

BACKGROUND

As computer storage technology has advanced, high capacity portable storage devices have become increasingly commonplace. While these storage devices can store a large amount of information, their portable nature and frequently small size allows them to be easily lost or stolen. Accordingly, security mechanisms are being developed that protect the data stored on portable devices. However, due to the portable nature of such devices, situations can arise where a user desires to access data on a portable device via a computer that does not support the protection being used. These situations are problematic because they result in the user being restricted to using their portable device only on computers that support the protection used by their portable device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a storage volume encrypted using an encryption technique unsupported by an operating system of a computing device is accessed by the computing device. An access application on the encrypted storage volume is identified and executed without administrator privileges at the computing device. The access application allows the computing device to access encrypted data files stored on the encrypted storage volume.

In accordance with one or more other aspects, a discovery volume portion is generated on a storage volume and an access application is stored in the discovery volume portion. The access application can be executed by an operating system of a computing device lacking support for an encryption technique used to encrypt the storage volume, and can allow the computing device to access data on the storage volume encrypted using the encryption technique.

BRIEF DESCRIPTION OF THE DRAWINGS

The same numbers are used throughout the drawings to reference like features.

DETAILED DESCRIPTION

Storage volume protection supporting legacy systems is discussed herein. A removable storage volume is encrypted so that only users with the proper credentials (such as a passphrase) can access the encrypted data. Some operating systems support the encryption technique used by the storage volume and are able to allow users with the proper credentials to access the encrypted data. Other legacy operating systems do not support this encryption technique. For such a legacy system, a discovery volume portion of the removable storage volume is accessible to the legacy system. The discovery volume portion stores an access application that can be executed by the legacy system to verify the credentials of a user of the legacy system and permit users with verified credentials to access the encrypted data. This access application can also be executed by the legacy system without administrator privileges on the legacy system.

Figure 1:
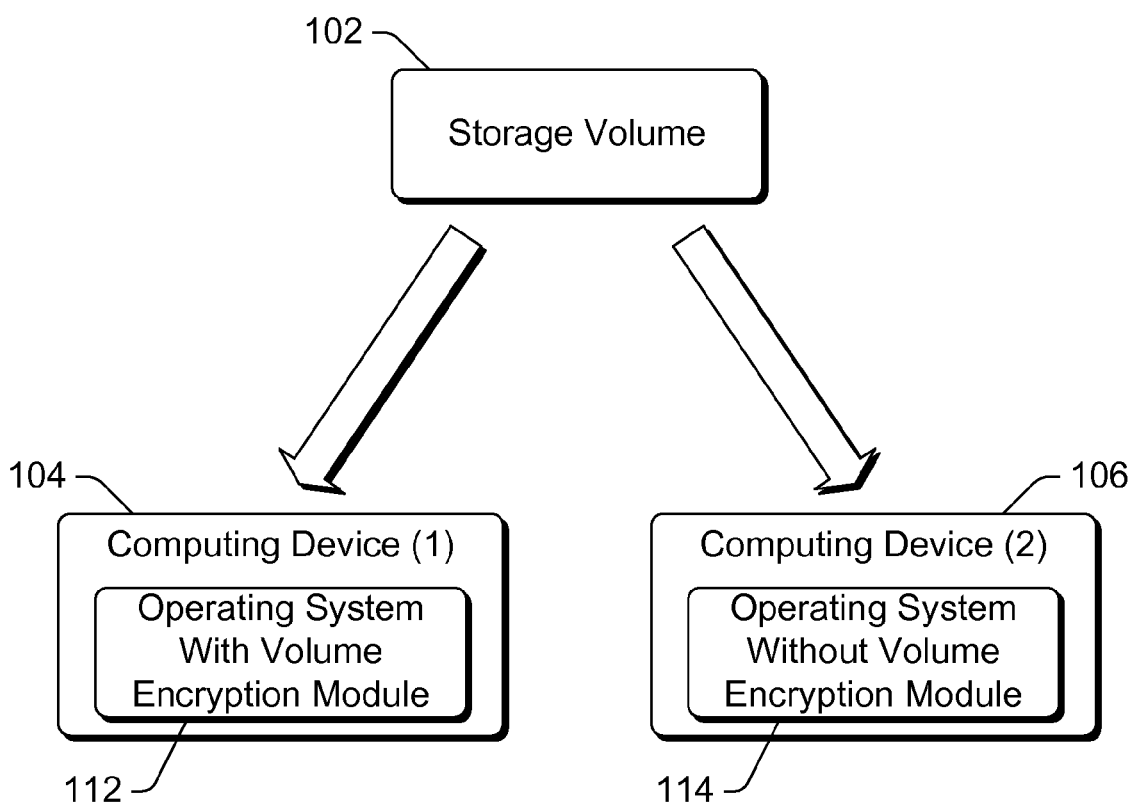
FIG. 1 illustrates an example system implementing the storage volume protection supporting legacy systems in accordance with one or more embodiments.

FIG. 1 illustrates an example system 100 implementing the storage volume protection supporting legacy systems in accordance with one or more embodiments. System 100 includes a removable storage volume 102 that can be coupled to computing device 104 and computing device 106. Removable storage volume 102 is typically coupled to only one of devices 104 and 106 at a time, although alternatively storage volume 102 can be coupled to devices 104 and 106 concurrently.

Storage volume 102 can be a storage device implemented using a variety of different technologies, such as a flash memory device, a magnetic disk, an optical disc, and so forth. Storage volume 102 can also be a portion of a storage device that is treated by computing devices and operating systems logically as a storage device. For example, a storage volume can be a partition of a hard drive, a portion of a flash memory device, and so forth.

Storage volume 102 can be coupled to devices 104 and 106 in a variety of different wired and/or wireless manners. For example, volume 102 can be coupled to devices 104 and 106 via a Universal Serial Bus (USB) connection, a wireless USB connection, an IEEE 1394 connection, a Bluetooth connection, and so forth.

Removable storage volume 102 is typically a portable device (or a portion of a portable device) that can be easily transported to different locations. This portability allows a user to easily move the device and couple storage volume 102 to different computing devices (e.g., devices 104 and 106 of FIG. 1).

Computing devices 104 and 106 can each be a variety of different types of devices capable of communication with storage volume 102. For example, each of computing devices 104 and 106 can be a desktop computer, a mobile station, an entertainment appliance, a set-top box communicatively coupled to a display device, a wireless phone, a game console, an automotive computer, and so forth. Thus, each of computing devices 104 and 106 may range from a full resource device with substantial memory and processor resources (e.g., personal computers, game consoles) to a low-resource device with limited memory and/or processing resources (e.g., traditional set-top boxes, hand-held game consoles). Additionally, each of devices 104 and 106 can be the same type of device or alternatively different types of devices.

To protect the data stored on storage volume 102, storage volume 102 is encrypted using a volume-based or drive-based encryption technique. In a volume-based or drive-based encryption technique, entire volumes and/or drives are encrypted rather than individual files stored on those volumes and/or drives. In one or more embodiments, the encryption technique employed by storage volume 102 is the BitLocker™ drive encryption technique available from Microsoft Corporation of Redmond, Wash. Alternatively, other public and/or proprietary encryption techniques can be employed.

The storage volume protection supporting legacy systems discussed herein allows storage volume 102 to be protected using a particular encryption technique, and allows both computing devices with operating systems that support this particular encryption technique and computing devices with operating systems that do not support this particular encryption technique to access the encrypted data. In system 100, computing device 104 includes an operating system with a volume encryption module 112. Operating system 112 includes a volume encryption module that supports the particular encryption technique used to protect storage volume 102, so computing device 104 supports the particular encryption technique used to protect storage volume 102. Accordingly, when storage volume 102 is coupled to computing device 104, operating system 112 is able to access the encrypted data on volume 102.

In contrast, computing device 106 includes an operating system without a volume encryption module 114. Accordingly, operating system 114 itself is not programmed or configured to be able to access the encrypted data on volume 102, and computing device 106 lacks support for the particular encryption technique used to protect storage volume 102. An operating system that lacks support for the encryption technique used by storage volume 102 is also referred to as a legacy system. A computing device running a legacy operating system can also be referred to as a legacy device. Nonetheless, storage volume 102 includes an access application that can be executed by computing device 106 to allow device 106 to access the encrypted data on volume 102. Thus, when storage volume 102 is coupled to computing device 106, the encrypted data on storage volume 102 can be accessed by computing device 106 even though the encryption technique used by storage volume 102 is not supported by computing device 106.

As protected storage volume 102 is accessible by both computing devices that support the encryption technique used by volume 102 and computing devices that lack support for the encryption technique used by volume 102, storage volume 102 can also be referred to as a hybrid protected storage device or volume.

Figure 2:
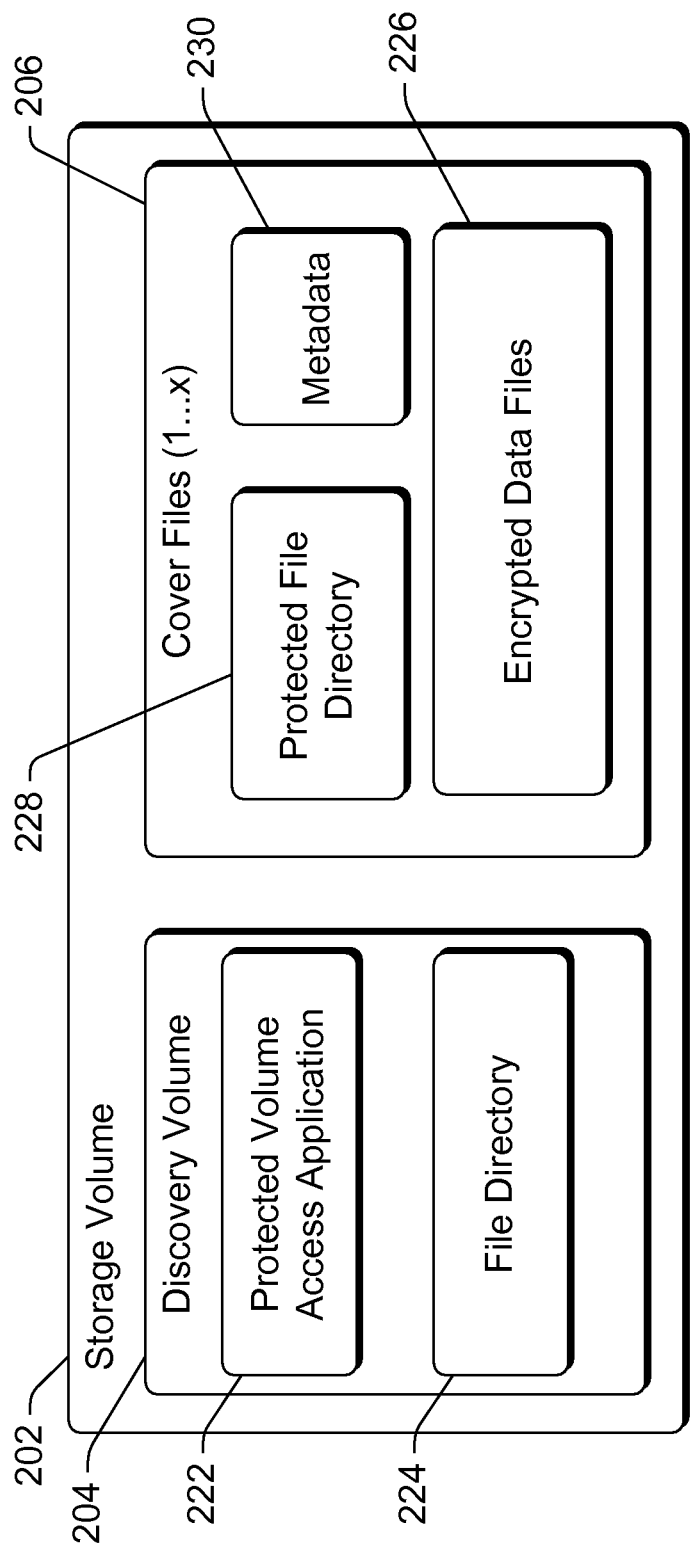
FIG. 2 illustrates an example storage volume in accordance with one or more embodiments.

FIG. 2 illustrates an example storage volume 202 in accordance with one or more embodiments. Storage volume 202 can be, for example, a storage volume 102 of FIG. 1. Storage volume 202 includes a discovery volume portion 204 and a cover file portion 206.

Generally, one or more encrypted data files 226 can be stored in cover file portion 206, which includes one or more (x) cover files. Cover file portion 206 also includes a protected file directory 228 that is a data structure identifying the locations of each of the encrypted data files 226 on storage volume 202. Discovery volume portion 204 is used by operating systems lacking support for the encryption technique used to protect storage volume 202. Protected volume access application 222 allows such systems to access protected file directory 228 and other encrypted data stored on storage volume 202 after verifying that a user of such a system has appropriate credentials to access the encrypted data. Systems that support the encryption technique used to protect storage volume 202 can bypass discovery volume portion 204 and protected volume access application 222 in order to access the encrypted data files 226 in cover file portion 206. Protected file directory 228 can be stored in one cover file of portion 206, or alternatively stored across two or more cover files of portion 206.

More specifically, discovery volume portion 204 includes protected volume access application 222 and file directory 224. Discovery volume portion 204 is typically located at the beginning of storage volume 202. This beginning location refers to the location of storage volume 202 that is typically first accessed by a computing device when the computing device establishes communication with storage volume 202 in order to identify the contents of volume 202. File directory 224 is a data structure that identifies the files stored in discovery volume 204 (e.g., one or more files that store protected volume access application 222) as well as identifiers of the one or more cover files in portion 206.

Each cover file in portion 206 can store one or more encrypted data files 226 or portions thereof. These encrypted files can store a variety of different data for use by a variety of different applications. Collectively, the cover files in portion 206 store the encrypted data files 226 of storage volume 202. These encrypted data files can be distributed among the cover files in a variety of different manners. For example, at any given time each cover file may store one or more encrypted data files, one or more cover files may store no encrypted data files, portions of an encrypted data file can be stored in two or more cover files, and so forth.

The number of cover files in portion 206 can vary. In one or more embodiments, storage volume 202 is configured to be accessible by operating systems or file systems that have restrictions on file sizes. For example, some operating systems or file systems can have a restriction that limits file sizes to 4 Gigabytes (GB). In such cases, each cover file in portion 206 is 4 GB or less. The number of cover files included in portion 206 depends at least in part on the size of storage volume 202. For example, if the operating system or file system has a restriction that limits file sizes to 4 GB, then the number of cover files in portion 206 can be calculated to be at least the size of storage volume 202 divided by 4 GB, rounded up to the next whole number. It is to be appreciated that situations can arise where there is overhead associated with each of the cover files, which can increase the number of cover files that are used. Additionally, an operating system or file system can optionally request that additional cover files be included if desired.

Metadata 230 includes various information regarding the protection of storage volume 202. Metadata 230 can be stored in one cover file of portion 206, or alternatively stored across two or more cover files of portion 206. The specific information stored as metadata 230 can vary based on the encryption technique used by storage volume 202. By way of example, metadata 230 can include one or more pointers to various data structures or other information on storage volume 202, an indication of where particular portions (e.g., portion 204, portion 206, etc.) are located on storage volume 202, digital signatures over one or more portions of storage volume 202, and so forth.

During operation, when storage volume 202 is coupled to a device with an operating system that supports the encryption technique used by storage volume 202, the operating system of the device detects the presence of the discovery volume portion 204. This detection of the presence of discovery volume portion 204 can be made in a variety of manners. In one or more embodiments, a particular sequence of bits is stored in a particular location of discovery volume portion 204. The operating system accesses this particular location of portion 204 and checks for this particular sequence of bits. If this particular sequence of bits is present at that particular location, the operating system knows the storage volume 202 is a protected storage volume. However, if this particular sequence of bits is not present at that particular location, then the operating system knows that storage volume 202 is not a protected storage volume and can proceed to access data on volume 202 in a conventional manner.

Alternatively, the operating system can detect the presence of discovery volume portion 204 in other manners. For example, an indication of the presence of discovery volume portion 204 can be included in metadata 230 or elsewhere on storage volume 202, the operating system can be informed of the presence of discovery volume portion 204 by another component or module of the computing device communicating with storage volume 202, the operating system can be informed of the presence of discovery volume portion 204 by a user, and so forth.

In response to detecting that storage volume 202 is a protected storage volume, the operating system of the computing device obtains and verifies the credentials of a current user of the computing device. These credentials and their verification can take a variety of different forms. In one or more embodiments, the credentials are a password or passphrase entered by the user (e.g., via a keyboard, microphone or other input mechanism of the computing device) from which one or more keys are generated that can be used to decrypt the encrypted data files 226. Generation of a key based on a password or passphrase is well known in the art and thus will not be discussed further except as it pertains to the storage volume protection supporting legacy systems discussed herein. In such embodiments, the credentials are verified inherently in generating the one or more keys—if the credentials are incorrect then the one or more keys generated based on those credentials will not decrypt the encrypted data files. Alternatively, these credentials and their verification can take other forms, such as a key or passphrase received from a smart card or other device of the user, a key or passphrase received from another component or device, a fingerprint scan matching a fingerprint stored by the computing device, and so forth. If the user's credentials are not verified, then access to the encrypted data files is not allowed.

Once the user's credentials are verified, the operating system accesses the location of storage volume 202 where protected file directory 228 is stored. In one or more embodiments, a pointer to or other identifier of the location of protected file directory 228 is included in discovery volume portion 204. The operating system accesses this pointer or other identifier to identify the location of protected file directory 228. Alternatively, the location of protected file directory 228 can be a known location on storage volume 202. Accordingly, computing devices that support the encryption technique used by storage volume 202 are also programmed or otherwise configured with the location of protected file directory 228.

Protected file directory 228 is encrypted and can be decrypted using the one or more keys generated based on the credentials discussed above. Because the operating system supports the encryption technique used by storage volume 202, the operating system understands the structure and encryption of protected file directory 228. Protected file directory 228 identifies the locations of encrypted data files 226 on storage volume 202. Accordingly, when file directory 228 is decrypted, the encrypted data files 226 can be accessed.

The operating system can allow the user or one or more other applications executing on the computing device to access the encrypted data files 226 as identified in directory 228. Encrypted data files 226 are decrypted by the operating system as needed (e.g., a particular data file can be decrypted in response to a request to access that particular data file). This access to encrypted data files 226 can include reading one or more encrypted data files 226, creating one or more new encrypted data files 226, deleting one or more encrypted data files 226, modifying one or more encrypted data files 226, renaming one or more encrypted data files 226, and so forth.

Thus, a computing device with an operating system that supports the encryption technique used by storage volume 202 need not use access application 222 or file directory 224 in discovery volume portion 204. Rather, the discovery volume portion 204 can be detected by an operating system of the computing device and then bypassed, with the operating system accessing protected file directory 228.

However, when storage volume 202 is coupled to a computing device having an operating system that lacks support for the encryption technique used by storage volume 202, the operating system of the computing device detects and accesses discovery volume portion 204. As such an operating system does not support the encryption technique used by storage volume 202, the presence of discovery volume portion 204 is not detected by that operating system in the same manner as detection is performed by an operating system that does support the encryption technique used by volume 202 as discussed above. The contents of the cover files in cover file portion 206, including protected file directory 228, are not understood by an operating system that does not support the encryption technique used by storage volume 202. However, discovery volume portion 204 is understood and is readable by the operating system.

When accessing discovery volume portion 204, the operating system accesses file directory 224. Using file directory 224, the operating system can access the contents of discovery volume 204. Additionally, even though the contents of the cover files in portion 206 are not intelligible to the operating system, cover file identifiers are included in file directory 224 allowing the operating system to see that the cover files exist on volume 202.

File directory 224 identifies the presence of protected volume access application 222 in discovery volume portion 204, allowing the operating system to identify and execute protected volume access application 222. Access application 222 is an application that can be executed by the operating system from storage volume 202. The operating system need not install application 222 on the computing device running the operating system. Furthermore, in one or more embodiments the operating system can be configured to enforce security measures that require a current user of the computing device to have administrator privileges in order to install an application on the computing device. As application 222 can be executed from storage volume 202 and need not be installed on the computing device, the current user of the computing device need not have any such administrator privileges in order to execute application 222.

Once executing, application 222 obtains and verifies the credentials of a user of the computing device. These credentials are the same as discussed above, and their verification is performed in the same manner as is done by an operating system that supports the encryption technique used by storage volume 202 as discussed above. Thus, rather than having an operating system verify the user's credentials, in a computing device lacking support for the encryption technique used by storage volume 202 access application 222 verifies the user's credentials.

If the user's credentials are not verified, then access to encrypted data files is not allowed. However, if the user's credentials are verified, then protected volume access application 222 can access and decrypt the contents of the cover files in cover file portion 206. This allows application 222 to access and decrypt protected file directory 228, which allows application 222 to access and decrypt encrypted data files 226 using the same techniques as an operating system that supports the encryption technique used by storage volume 202 as discussed above.

Protected volume access application 222 can identify the location of protected file directory 228 in a variety of different manners. For example, a pointer to or other identifier of the location of protected file directory 228 can be included in discovery volume portion 204 and accessed by application 222, the location of protected file directory 228 can be a known location on storage volume 202, and so forth.

In one more embodiments, access application 222 can access encrypted data files 226 in portion 206 in the same manner as an operating system that supports the encryption technique used by storage volume 202. For example, this access can include reading one or more encrypted data files 226, creating one or more new encrypted data files 226, deleting one or more encrypted data files 226, modifying one or more encrypted data files 226, renaming one or more encrypted data files 226, and so forth. Alternatively, access to encrypted data files 226 by access application 222 can be restricted. For example, access application 222 may have read-only access to encrypted data files 226 (e.g., application 222 can read encrypted data files 226 but cannot modify encrypted data files 226 (or file names in directory 228) or create new encrypted files 226).

Discovery volume portion 204 as illustrated includes access application 222 and file directory 224. In other embodiments, additional files and/or data can be included in discovery volume portion 204. An example of such an additional file and/or data is a "readme" file. The "readme" file is not encrypted and is accessible to operating systems that do not support the encryption technique of storage volume 202. The "readme" file includes an indication (typically a text description) that storage volume 202 is a protected volume and that access application 222 can be executed in order to access data stored on volume 202. A user of a device that does not support the encryption technique of storage volume 202 can open and read the "readme" file to determine how to proceed to access the encrypted data on volume 202 with such a device.

Another example of such an additional file and/or data in discovery volume portion 204 is an "autorun" file. An "autorun" file can be identified and accessed by a device having an operating system that does not support the encryption technique of storage volume 202 when storage volume 202 is coupled to the device. The "autorun" file indicates to the operating system that protective volume access application 222 is to be executed when storage volume 202 is coupled to the device. Thus, when storage volume 202 is coupled to the device, the "autorun" file is identified, accessed, and application 222 is executed. Alternatively, rather than immediately executing application 222, the "autorun" file can indicate that a prompt to the user is to be displayed or otherwise presented querying the user as to whether access application 222 is to be executed in order to access the contents of volume 202. If the user indicates yes then application 222 is executed; otherwise, application 222 is not executed and access to encrypted data files is not allowed.

Additionally, it is to be appreciated that situations can arise where it is desirable to update protected volume access application 222. Such situations can arise, for example, when it is desired to add functionality or features to application 222, when it is desired to modify the operation of application 222, and so forth. In one or more embodiments, discovery volume portion 204 includes a reserved part that is initially empty (e.g., stores no data). Alternatively, various data that is not intended to be accessed by a computing device can be stored in the reserved part. The new version of application 222 can be larger than, and thus occupy more space on storage volume 202 than, the current version of application 222. In such situations, this reserved part of portion 204 is used to store part of the new version of application 222. Thus, even though the new version of application 222 is too large to be stored in exactly the same location as the current version of application 222, the new version of application 222 can still be stored in discovery volume portion 204 by making use of the reserved part. Accordingly, the size of discovery volume portion 204 need not change and other portions of storage volume 202 need not be rearranged despite the larger size of the new version of application 222.

In the discussions above, protected volume access application 222 is discussed as accessing protected file directory 228. Alternatively, discovery volume 204 can include an additional protected file directory that is accessed by application 222. This additional protected file directory maintains the same information regarding encrypted data files 226 as protected file directory 228 maintains. This additional protected file directory is also encrypted using the same encryption technique as is used to encrypt encrypted data files 226 and protected file directory 228. Accordingly, application 222 accesses this additional protected file directory only if the user has the proper credentials to access the encrypted data files 226.

Additionally, it should be noted that in the discussions above metadata 230 is discussed as being included in cover file portion 206. Alternatively, metadata 230 (or a portion thereof) can be stored separately from portion 206. In such situations, the metadata stored separately from portion 206 is also encrypted using the same encryption technique as is used to encrypt encrypted data files 226 and protected file directory 228. Accordingly, application 222 or an operating system that supports the encryption technique used by storage volume 202 allows access to this additional protected file directory only if the user has the proper credentials to access the encrypted data files 226.

Figure 3:
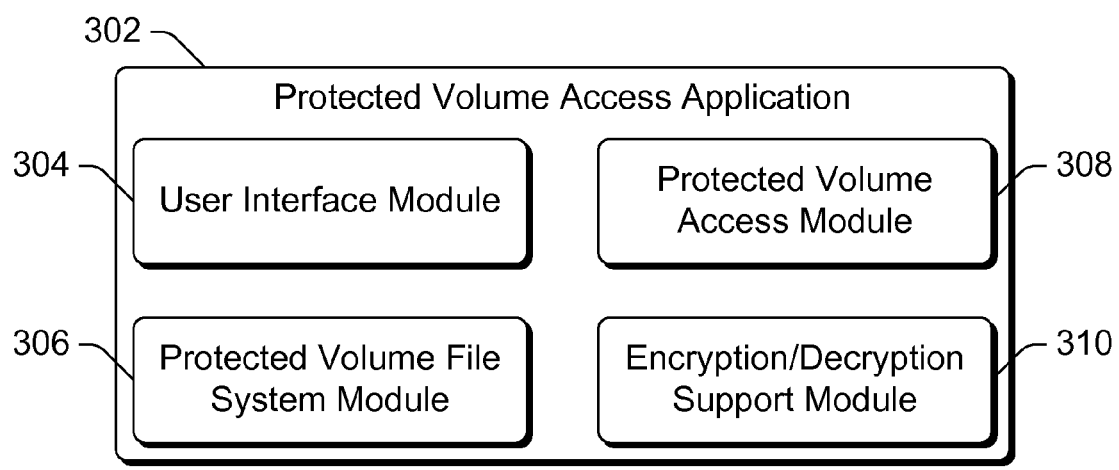
FIG. 3 illustrates an example protected volume access application in accordance with one or more embodiments.

FIG. 3 illustrates an example protected volume access application 302 in accordance with one or more embodiments. Protected volume access application 302 can be, for example, a protected volume access application 222 of FIG. 1. Protected volume access application 302 includes a user interface module 304, a protected volume file system module 306, a protected volume access module 308, and an encryption/decryption support module 310.

User interface module 304 displays or otherwise presents a user interface to a user of the computing device accessing the storage volume (e.g., storage volume 202 of FIG. 2). This user interface can display information to the user regarding accessing the protected storage volume, such as querying the user whether a protected volume access application (e.g., application 222 of FIG. 2) is to be executed in order to access the contents of volume 202, notifying the user that the storage volume is a protected volume and read-only access is permitted to the storage volume, and so forth. This user interface can also identify the various encrypted data files that are stored on the storage volume, which can include various folders or directories in which encrypted data files are stored. In one or more embodiments, user interface module 304 displays a user interface that is similar to a file display user interface displayed by an operating system that supports the encryption technique used by the storage volume.

Alternatively, user interface module 304 can display a user interface including information regarding accessing the protected storage volume, but rely on the legacy operating system to display the encrypted data files. Module 304, or alternatively another component or module of application 302, can expose the encrypted data files to the legacy operating system for display by the legacy operating system.

Protected volume access module 308 accesses the cover files and encrypted data stored on the protected storage volume. Protected volume file system module 306 accesses, using protected volume access module 308, the encrypted data files stored in the cover files on the protected storage volume.

Encryption/decryption support module 310 provides encryption and/or decryption support for the storage volume. Module 310 is programmed or otherwise configured with knowledge of the encryption technique used by the storage volume. Module 310 can use the appropriate one or more keys to encrypt data files and/or decrypt encrypted data files as well as other encrypted data on the storage volume. It is to be appreciated that in some situations module 310 need not provide encryption support for the storage volume. For example, if legacy systems are permitted read-only access to the protected storage volume, then encryption support need not be included in module 310.

Figure 4:
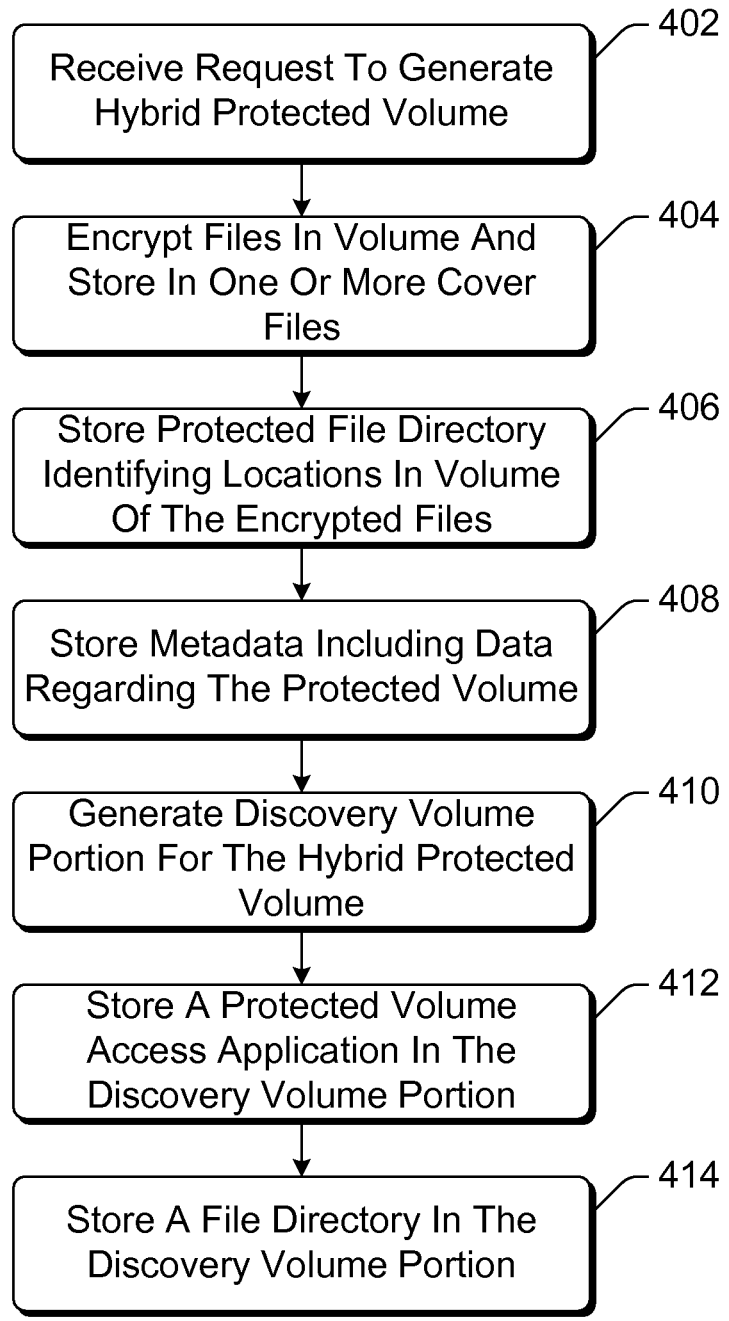
FIG. 4 is a flowchart illustrating an example process for creating a hybrid protected storage volume in accordance with one or more embodiments.

FIG. 4 is a flowchart illustrating an example process 400 for creating a hybrid protected storage volume in accordance with one or more embodiments. Process 400 is carried out by a computing device, such as computing device 104 of FIG. 1, and can be implemented in software, firmware, hardware, or combinations thereof. Process 400 is an example process for creating a hybrid protected storage volume; additional discussions of creating a hybrid protected storage volume are included herein with reference to different figures.

In process 400, a request to generate a hybrid protected storage volume is received (act 402). This request can be received in response to a variety of different actions. For example, a user of the storage volume may input a request that the storage volume be converted to a hybrid protected volume. By way of another example, a security policy on a computing device that the storage volume is coupled to may indicate that any removable storage volume coupled to the computing device that is not a hybrid protected storage volume is to be converted to a hybrid protected storage volume. In such cases, the operating system or another component or module of the computing device requests that the storage volume be converted to a hybrid protected storage volume.

In response to the request, data files already stored on the volume are encrypted and stored in one or more cover files (act 404). As discussed above, the encryption of data files can be based on a key obtained from user credentials or elsewhere. Accordingly, such a key is obtained for encryption of the files in act 404. If no data files are already stored on the volume, then there are no data files to encrypt in act 404. However, the one or more cover files are still generated in act 404 even though they do not yet contain data files. The cover files generated in act 404 can be, for example, cover files in cover file portion 206 of FIG. 2.

A protected file directory identifying locations in the hybrid protected volume where the encrypted data files are stored is also generated and stored in the one or more cover files (act 406). This generating of the protected file directory can include encrypting a previously generated directory. If there are no encrypted data files on the volume yet, a protected file directory is still generated and stored in act 406 so that subsequently added encrypted data files can be listed in the directory. The protected file directory in act 406 can be, for example, protected file directory 228 of FIG. 2.

Metadata including data regarding the hybrid protected volume is also generated (act 408). A variety of information regarding the hybrid protected storage volume can be stored as metadata as discussed above. The metadata in act 408 can be, for example, metadata 230 of FIG. 2.

A discovery volume portion for the hybrid protected storage volume is also generated (act 410). The discovery volume portion in act 410 can be, for example, discovery volume portion 204 of FIG. 2. A protected volume access application is stored in the discovery volume portion (act 412). The protected volume access application in act 412 can be, for example, protected volume access application 222 of FIG. 2.

A file directory is also stored in the discovery volume portion (act 414). The file directory is a data structure that identifies the files stored in discovery volume 204 as well as identifiers of the one or more cover files. The file directory can be, for example, file directory 224 of FIG. 2.

Figure 5:
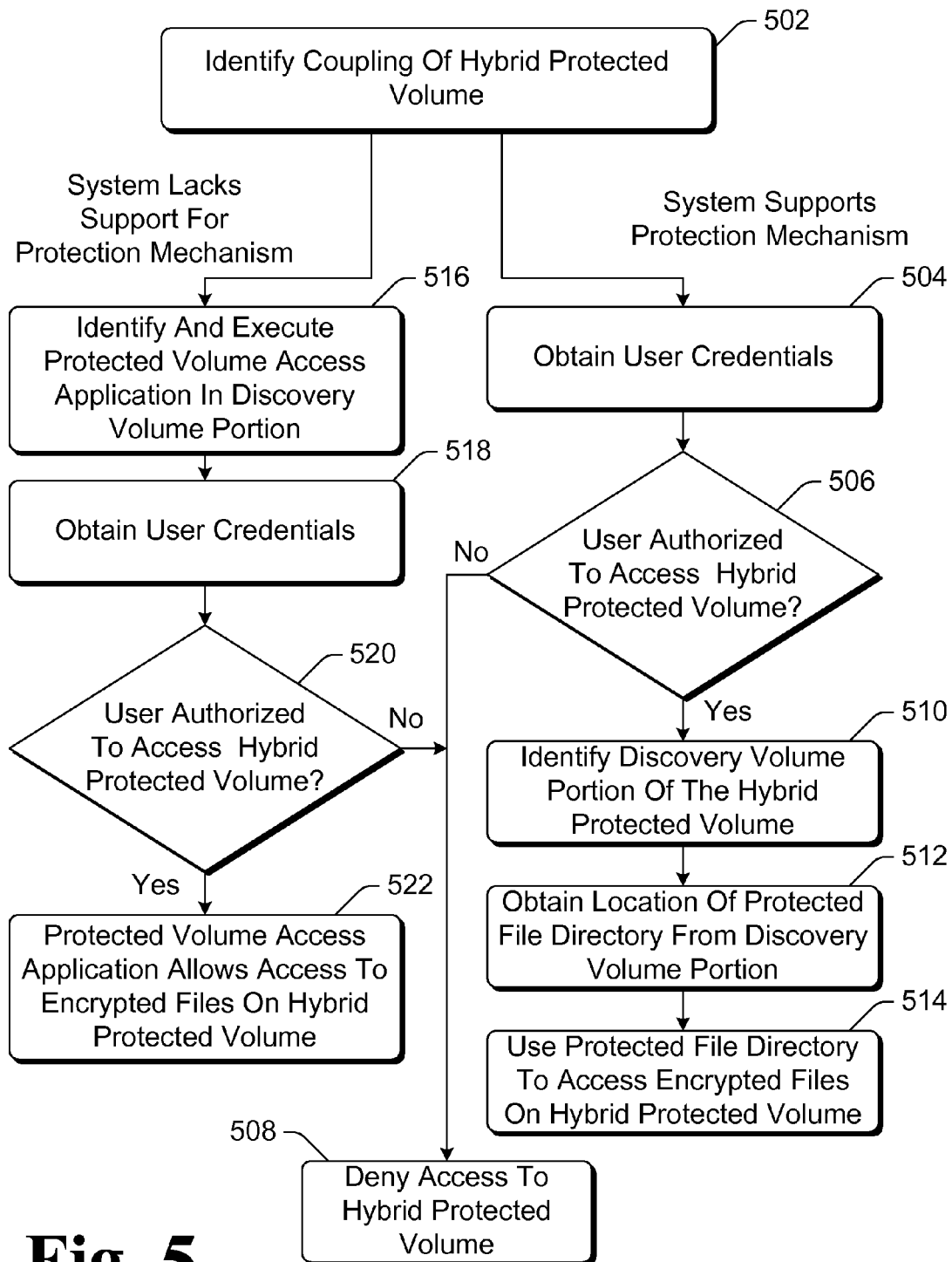
FIG. 5 is a flowchart illustrating an example process for accessing a hybrid protected storage volume in accordance with one or more embodiments.

FIG. 5 is a flowchart illustrating an example process 500 for accessing a hybrid protected storage volume in accordance with one or more embodiments. Process 500 is carried out by a computing device, such as computing device 104 or computing device 106 of FIG. 1, and can be implemented in software, firmware, hardware, or combinations thereof. Process 500 is an example process for accessing a hybrid protected storage volume; additional discussions of accessing a hybrid protected storage volume are included herein with reference to different figures.

In process 500, coupling of a hybrid protected storage volume to the device implementing process 500 is identified (act 502). As discussed above, this coupling can take a variety of different forms and the coupling of a volume to a device can be identified in a variety of different manners based on the particular type of coupling. The hybrid protected storage volume is accessed by the device implementing process 500 as part of the coupling process.

Process 500 then proceeds based on whether the operating system of the device implementing process 500 supports the protection mechanism used by the hybrid protected storage volume or lacks support for the protection mechanism used by the hybrid protected storage volume. If the operating system of the device implementing process 500 supports the protection mechanism used by the hybrid protected storage volume then user credentials are obtained (act 504). These user credentials are credentials of the current user of the device implementing process 500.

Given the credentials obtained in act 504, a check is then made as to whether the user is authorized to access the hybrid protected storage volume (act 506). If the user is not authorized to access the hybrid protected storage volume then access to the volume is denied (act 508). An indication of this denial of access can optionally be displayed or otherwise presented to the user in act 508.

However, if the user is authorized to access the hybrid protected storage volume, then the discovery volume portion of the hybrid protected storage volume is identified (act 510), and the location of the protected file directory is obtained from the discovery volume portion (act 512). Alternatively, if the location of the protected file directory is stored in a different portion other than the discovery volume portion, then this different portion is accessed in acts 510 and 512. The protected file directory is then used to access the encrypted data files on the hybrid protected storage volume (act 514).

Returning to act 502, if the operating system of the device implementing process 500 lacks support for the protection mechanism used by the hybrid protected volume then a protected volume access application in the discovery volume portion of the hybrid protected storage volume is identified and executed (act 516).

The protected volume access application obtains the user credentials (act 518), analogous to act 504. Given the credentials obtained in act 518, a check is then made as to whether the user is authorized to access the hybrid protected volume (act 520), analogous to act 506. If the user is not authorized to access the hybrid protected storage volume then access to the volume is denied (act 508). However, if the user is authorized to access the hybrid protected storage volume, then the protected volume access application allows a device implementing process 500 to access the encrypted data files on the hybrid protected volume (act 522). This allowing includes obtaining the location of the protected file directory, and using the protected file directory to access encrypted files on the hybrid protected volume, analogous to acts 512 and 514 above.

Figure 6:
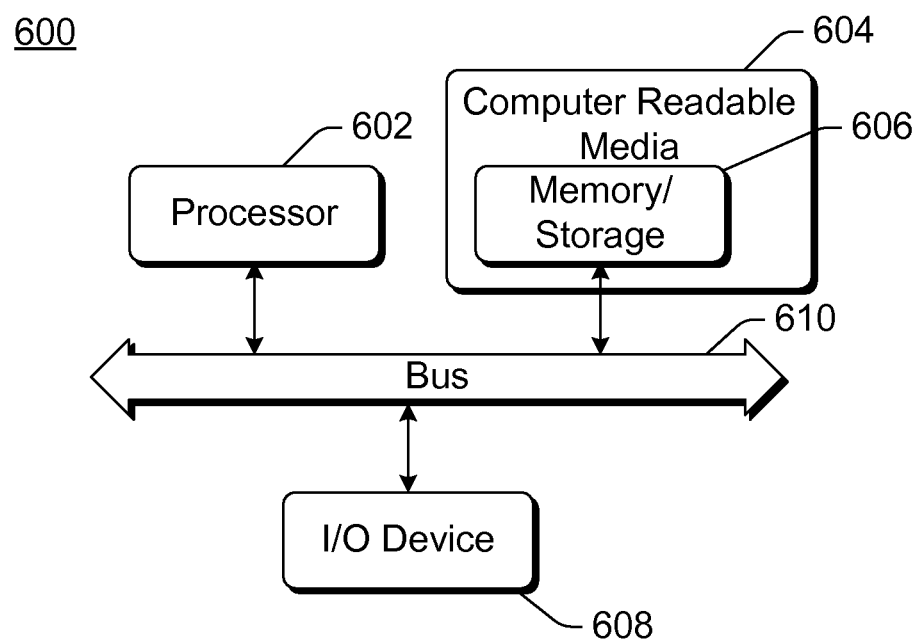
FIG. 6 illustrates an example computing device that can be configured to implement the storage volume protection supporting legacy systems in accordance with one or more embodiments.

FIG. 6 illustrates an example computing device 600 that can be configured to implement the storage volume protection supporting legacy systems in accordance with one or more embodiments. Computing device 600 can be, for example, a computing device 104 or 106 of FIG. 1.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Memory and/or storage components 606 can include, for example, a hybrid protected storage volume (e.g., storage volume 202 of FIG. 2). Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 6. The features of the storage volume protection supporting legacy systems techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   accessing an encrypted storage volume having been encrypted using an encryption technique supported by some operating systems but not by other operating systems;
   if the encryption technique is unsupported by an operating system of the computing device, then:
     identifying an access application on the encrypted storage volume;
     executing the access application, the access application allowing the computing device to access encrypted data files stored in a first portion of the encrypted storage volume;

accessing a file directory in a second portion of the encrypted storage volume, the file directory identifying locations of one or more files in the second portion as well as locations of multiple cover files in the first portion that include the encrypted data files; and the access application accessing a protected file directory in the first portion, the protected file directory being stored across two or more of the multiple cover files and identifying locations of the encrypted data files in the first portion; and if the encryption technique is supported by the operating system of the computing device, then:

the operating system allowing the computing device to bypass the access application and access the encrypted data files stored on the encrypted storage volume.

2. A method as recited in claim 1, the access application further verifying credentials of a current user of the computing device, and allowing the device to access the encrypted data files only if the credentials are verified.

3. A method as recited in claim 2, the credentials of the current user comprising a password entered by the current user.

4. A method as recited in claim 1, the access application allowing the computing device to access the encrypted data files comprising allowing the computing device read-only access to the encrypted data files.

5. A method as recited in claim 1, the method further comprising:

if the encryption technique is supported by the operating system of the computing device, then accessing the protected file directory in the first portion to identify locations of the encrypted data files in the first portion.

6. A method as recited in claim 1, the encrypted storage volume comprising a portable flash memory storage device.

7. A method as recited in claim 1, further comprising displaying a prompt notifying a current user of the computing device that the access application is to be executed in order to access the encrypted data files, and executing the access application only if a user input indicates that the access application is to be executed.

8. A method as recited in claim 7, further comprising automatically displaying the prompt when the encrypted storage volume is coupled to the computing device.

9. A method as recited in claim 1, the protected file directory allowing the computing device to bypass the access application and access the encrypted data files if the encryption technique is supported by the operating system.

10. A method implemented in a computing device, the method comprising:

generating a discovery volume portion on a storage volume;

storing, in the discovery volume portion, an access application that can be bypassed by a first additional computing device having an operating system supporting an encryption technique used to encrypt the storage volume, and that can be executed by a second additional computing device having an operating system lacking support for the encryption technique used to encrypt the storage volume, the access application allowing the second additional computing device to access data on the storage volume encrypted using the encryption technique; and storing, across multiple cover files on the storage volume, a protected file directory identifying where one or more encrypted files are stored on the storage volume, the multiple cover files including the one or more encrypted files, and the protected file directory allowing the first additional computing device to access the one or more encrypted files.

11. A method as recited in claim 10, the access application being executable by the second additional computing device to allow access to the one or more encrypted files only after the access application has verified credentials of a current user of the second additional computing device.

12. A method as recited in claim 11, the credentials of the current user comprising a passphrase entered by the current user.

13. A method as recited in claim 10, the storage volume comprising a portable flash memory storage device.

14. A method as recited in claim 10, further comprising including in the discovery volume portion a reserved part in which at least part of a new version of the access application can be stored.

15. A method as recited in claim 10, further comprising storing, in the discovery volume portion, an autorun file that indicates to the second additional computing device to display, when the storage volume is coupled to the second additional computing device, a prompt notifying a current user of the second additional computing device that the access application is to be executed in order to access the one or more encrypted files.

16. A method as recited in claim 15, the access application being executable by the second additional computing device to allow access to the one or more encrypted files only after a user input in response to the prompt indicates the access application is to be executed, and only after the access application has verified credentials of the current user.

17. A method as recited in claim 10, wherein the access application is allowed read-only access to the one or more encrypted files.

18. A storage volume comprising:

a first portion storing both one or more encrypted files and a protected file directory of the one or more encrypted files, the protected file directory being accessible to one or more devices with operating systems that support an encryption technique used by the storage volume, the protected file directory allowing the one or more devices with operating systems that support the encryption technique used by the storage volume to bypass an access application, the one or more encrypted files being stored in multiple cover files of the first portion, and the protected file directory being stored across two or more of the multiple cover files;

a second portion storing both the access application that is executed by one or more other devices with operating systems that lack support for the encryption technique used by the storage volume and a file directory of one or more files in the second portion as well as the multiple cover files in the first portion, wherein execution of the access application can be done without administrator privileges on the one or more other devices; and the access application, when executed, verifying credentials of a user of one of the one or more other devices and allowing the user to access the one or more encrypted files even though the one of the one or more other devices lacks support for the encryption technique used by the storage volume.

19. A storage volume as recited in claim 18, the second portion further storing a particular sequence of bits at a particular location to identify to the one or more devices with operating systems that support the encryption technique that the storage volume is encrypted using the encryption technique.

20. A method as recited in claim 10, further comprising storing, in the discovery volume portion, an additional protected file directory identifying where the one or more encrypted files are stored on the storage volume, the additional protected file directory allowing the access application to access the one or more encrypted files.

* * * * *